United States Patent
Ying et al.

(10) Patent No.: US 7,099,134 B2
(45) Date of Patent: Aug. 29, 2006

(54) APPARATUS FOR PROTECTING BOOST CONVERTER IN ABNORMAL OPERATION

(75) Inventors: Jianping Ying, Taoyuan Shien (TW); Teng Liu, Taoyuan Shien (TW); Xingkuan Guo, Taoyuan Shien (TW); Jianhong Zeng, Taoyuan Shien (TW)

(73) Assignee: Delta Electronics Inc., Taoyuan Hsien (TW)

( * ) Notice: Subject to any disclaimer, the term of this patent is extended or adjusted under 35 U.S.C. 154(b) by 101 days.

(21) Appl. No.: 10/852,793

(22) Filed: May 24, 2004

(65) Prior Publication Data

US 2004/0240239 A1 Dec. 2, 2004

(30) Foreign Application Priority Data

May 28, 2003 (TW) ................. 92114468 A

(51) Int. Cl.
*H02H 3/20* (2006.01)
*H02H 7/00* (2006.01)

(52) U.S. Cl. ........................ 361/91.7; 361/18
(58) Field of Classification Search ............. 361/91.7, 361/18; 363/53

See application file for complete search history.

(56) References Cited

U.S. PATENT DOCUMENTS

| 5,351,179 A | * | 9/1994 | Tsai et al. ............... 363/53 |
| 5,615,094 A | * | 3/1997 | Cosentino et al. ...... 361/91.7 |
| 5,943,224 A | * | 8/1999 | Mao ......................... 363/52 |

* cited by examiner

*Primary Examiner*—Shawn Riley
(74) *Attorney, Agent, or Firm*—Haverstock & Owens LLP

(57) ABSTRACT

An apparatus for preventing a boost converter from an abnormal operation is provided. The boost converter includes a transformer, a full-wave rectifier circuit electrically connected to a secondary winding of the transformer, an output filter inductor, an output filter capacitor, a clamping circuit having two clamping diodes with two anodes electrically connected to each other to form a common-anode terminal, a first clamping capacitor with a first terminal electrically connected to a node joining the filter inductor and the filter capacitor, and a second terminal electrically connected to the common-anode terminal, and an energy recycle circuit, and the apparatus includes a controllable voltage source having a first terminal electrically connected to the node and a second terminal electrically connected to the energy recycle circuit.

7 Claims, 10 Drawing Sheets

APPARATUS FOR PROTECTING BOOST CONVERTER IN ABNORMAL OPERATION

FIELD OF THE INVENTION

The present invention relates to an apparatus for protecting a boost converter in an abnormal operation. More specifically, this invention relates to the apparatus having a controllable voltage source to reset the inductor of the energy recycle circuit so as to protect the boost converter in the abnormal operation.

BACKGROUND OF THE INVENTION

Please refer to FIG. 1, it shows the schematic circuit diagram of a clamping and energy recycle circuit of the prior art. In which, diodes Dr1, Dr2, and capacitor C1 form a clamping circuit of the rectifying diodes D1 and D2. Capacitor C2, inductor L2, switch element Q1, and diode Dr3 form an energy recycle circuit. A constant-current output would be required by certain power supply even when the output capacitor is in the abnormal operation, but the problem regarding the voltage spikes during the reverse recovery of the diode still exists. To keep the voltage across the capacitor C1 unchanged, the included energy recycle circuit must be operated, and the duty ratio of the energy recycle circuit is proportional to the voltage across the capacitor C1. Since the duty ratio of the energy recycle circuit is relatively high, and the voltage across the capacitor Cout is relatively low due to the output is in the abnormal operation, such that the inductor L2 could not be reset. Thus, the energy recycle circuit would be damaged, and then the rectifying diodes, D1 and D2, would be damaged too.

Please refer to FIGS. 2, 3 and 4, which are the schematic circuit diagrams of three typical clamping and energy recycle circuits of the prior arts. All these circuits face the same problem, that is, when the output (Cout) is in the abnormal operation, the inductor L1 could not be reset. In FIG. 2, the capacitor C1 is electrically connected to the power supply in parallel, and is electrically connected to the output capacitor Cout in series. In which, the possible voltage spikes are clamped by the capacitor C1, and the energy from the capacitor C1 is transferred into the output capacitor Cout through an energy recycle circuit. The energy recycle circuit includes an inductor L1, a switch element Q1, and a diode D1. The output capacitor Cout, the diode D1, and the inductor L1 are connected in series to form a loop. In FIG. 3, the capacitors C1 and Cout are electrically connected to each other in series, and are electrically connected to the power supply in parallel. In which, the possible voltage spikes are clamped by the capacitors C1 and Cout electrically connected in series, and the energy from the capacitor C1 is transferred into the output capacitor Cout through the above-mentioned energy recycle circuit. In FIG. 4, the possible voltage spikes are clamped by the capacitor C1, and the energy from the power source is transferred into the output capacitor Cout through the above-mentioned energy recycle circuit. The aforementioned voltage spikes are caused by the reverse recovery of the diode or the switch element.

Keeping the drawbacks of the prior arts in mind, and employing experiments and research full-heartily and persistently, the apparatus for protecting the boost converter in the abnormal operation is finally conceived by the applicants.

SUMMARY OF THE INVENTION

It is therefore an object of the present invention to propose the apparatus for protecting the boost converter in the abnormal operation such that the inductor of the energy recycle circuit could be reset when the output is in the abnormal operation so as to increase the safety of the power supply.

According to the first aspect of the present invention, the apparatus for protecting the boost converter in the abnormal operation, wherein the boost converter includes a transformer, a full-wave rectifier circuit electrically connected to a secondary winding of the transformer, an output filter inductor, an output filter capacitor, a clamping circuit having two clamping diodes with two anodes electrically connected to each other to form a common-anode terminal, a first clamping capacitor with a first terminal electrically connected to a node joining the filter inductor and the filter capacitor, and a second terminal electrically connected to the common-anode terminal, and an energy recycle circuit, includes: a controllable voltage source having a first terminal electrically connected to the node and a second terminal electrically connected to the energy recycle circuit.

Preferably, the full-wave rectifier circuit includes two rectifying diodes with two anodes electrically connected to the secondary winding respectively and two cathodes electrically connected to each other to form a common-cathode terminal.

Preferably, the clamping circuit further includes a second clamping capacitor with a first terminal electrically connected to the common-cathode terminal and a second terminal electrically connected to the common-anode terminal.

Preferably, the energy recycle circuit includes: an inductor having a first terminal electrically connected to the controllable voltage source, a first switch element having a first terminal electrically connected to a second terminal of the inductor and a second terminal electrically connected to the common-anode terminal, and a diode with an anode electrically connected to the second terminal of the inductor and a cathode electrically connected to the common-cathode terminal.

Preferably, the controllable voltage source includes: a second switch element having a first terminal electrically connected to the node, a second terminal electrically connected to the energy recycle circuit, and a control terminal, a first regulating diode with a cathode electrically connected to the common-cathode terminal, a first resistor with a first terminal electrically connected to an anode of the first regulating diode and a second terminal electrically connected to the control terminal of the second switch element, a capacitor with a first terminal electrically connected to the common-cathode terminal and a second terminal electrically connected to the second terminal of the second switch element, a second resistor with a first terminal electrically connected to the second terminal of the capacitor and a second terminal electrically connected to the control terminal of the second switch element, and a second regulating diode with a cathode electrically connected to the control terminal of the second switch element and an anode electrically connected to the second terminal of the capacitor.

According to the second aspect of the present invention, the apparatus for protecting a boost converter having a clamping capacitor, an output capacitor, and an energy recycle circuit with an inductor, a first switch element, and a diode in an abnormal operation, wherein the apparatus is electrically connected to a power supply, the clamping capacitor is electrically connected to the power supply in parallel, a first terminal of the output capacitor is electrically connected to the clamping capacitor at a first node in series, and the output capacitor, the diode, and the inductor form a loop in series, includes: a controllable voltage source electrically connected to one of the three nodes of the loop in series.

Preferably, the controllable voltage source includes a first terminal electrically connected to the inductor of the energy recycle circuit and a second terminal electrically connected to the first node.

Preferably, the controllable voltage source includes: a second switch element having a first terminal electrically connected to the first node, a second terminal electrically connected to the inductor of the energy recycle circuit, and a control terminal, a first regulating diode with a cathode electrically connected to a second terminal of the output capacitor, a first resistor with a first terminal electrically connected to an anode of the first regulating diode and a second terminal electrically connected to the control terminal of the second switch element, a capacitor with a first terminal electrically connected to the second terminal of the output capacitor and a second terminal electrically connected to the second terminal of the second switch element, a second resistor with a first terminal electrically connected to the second terminal of the capacitor and a second terminal electrically connected to the control terminal of the second switch element, and a second regulating diode with a cathode electrically connected to the control terminal of the second switch element and an anode electrically connected to the second terminal of the capacitor.

Preferably, the controllable voltage source includes a first terminal electrically connected to the inductor of the energy recycle circuit and a second terminal electrically connected to a second terminal of the output capacitor.

Preferably, the controllable voltage source includes: a first regulating diode with an anode electrically connected to the first node, a first resistor with a first terminal electrically connected to a cathode of the first regulating diode, a second switch element having a first terminal electrically connected to the second terminal of the output capacitor, a second terminal, and a control terminal electrically connected to a second terminal of the first resistor, a capacitor with a first terminal electrically connected to the second terminal of the second switch element and a second terminal electrically connected to the first node, a second resistor with a first terminal electrically connected to the second terminal of the first resistor and a second terminal electrically connected to the second terminal of the second switch element, and a second regulating diode with a cathode electrically connected to the second terminal of the second resistor and an anode electrically connected to the first terminal of the second resistor.

Preferably, the controllable voltage source includes a first terminal electrically connected to the inductor of the energy recycle circuit and a second terminal electrically connected to the first node.

Preferably, the controllable voltage source includes: a first regulating diode with an anode electrically connected to a second terminal of the output capacitor, a first resistor with a first terminal electrically connected to a cathode of the first regulating diode, a second switch element having a first terminal electrically connected to the first terminal of the output capacitor, a second terminal, and a control terminal electrically connected to a second terminal of the first resistor, a capacitor with a first terminal electrically connected to the second terminal of the second switch element and a second terminal electrically connected to the anode of the first regulating diode, a second resistor with a first terminal electrically connected to the second terminal of the first resistor and a second terminal electrically connected to the second terminal of the second switch element, and a second regulating diode with a cathode electrically connected to the first terminal of the second resistor and an anode electrically connected to the second terminal of the second resistor.

Preferably, the controllable voltage source includes: a first regulating diode with a cathode electrically connected to the first node, a first resistor with a first terminal electrically connected to an anode of the first regulating diode, a second switch element having a first terminal electrically connected to a second terminal of the output capacitor, a second terminal, and a control terminal electrically connected to a second terminal of the first resistor, a capacitor with a first terminal electrically connected to the second terminal of the second switch element and a second terminal electrically connected to the cathode of the first regulating diode, a second resistor with a first terminal electrically connected to the second terminal of the first resistor and a second terminal electrically connected to the second terminal of the second switch element, and a second regulating diode with a cathode electrically connected to the first terminal of the second resistor and an anode electrically connected to the second terminal of the second resistor.

The present invention may best be understood through the following descriptions with reference to the accompanying drawings, in which:

DETAILED DESCRIPTION OF THE PREFERRED EMBODIMENT

Figure 2:
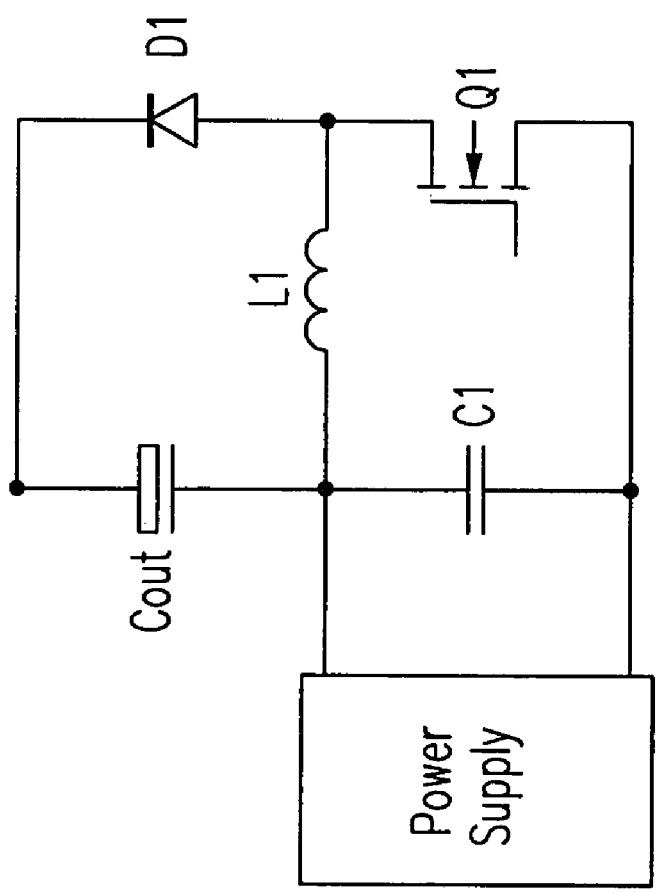
FIGS. 2, 3, and 4 are the schematic circuit diagrams of three typical clamping and energy recycle circuits of the prior arts.
Figure 3:
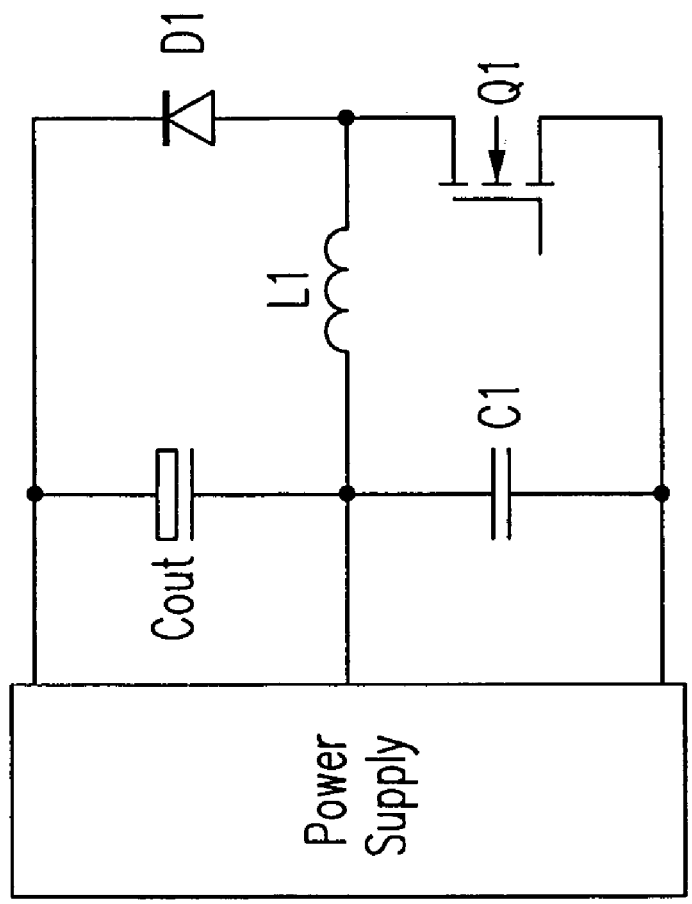
Figure 4:
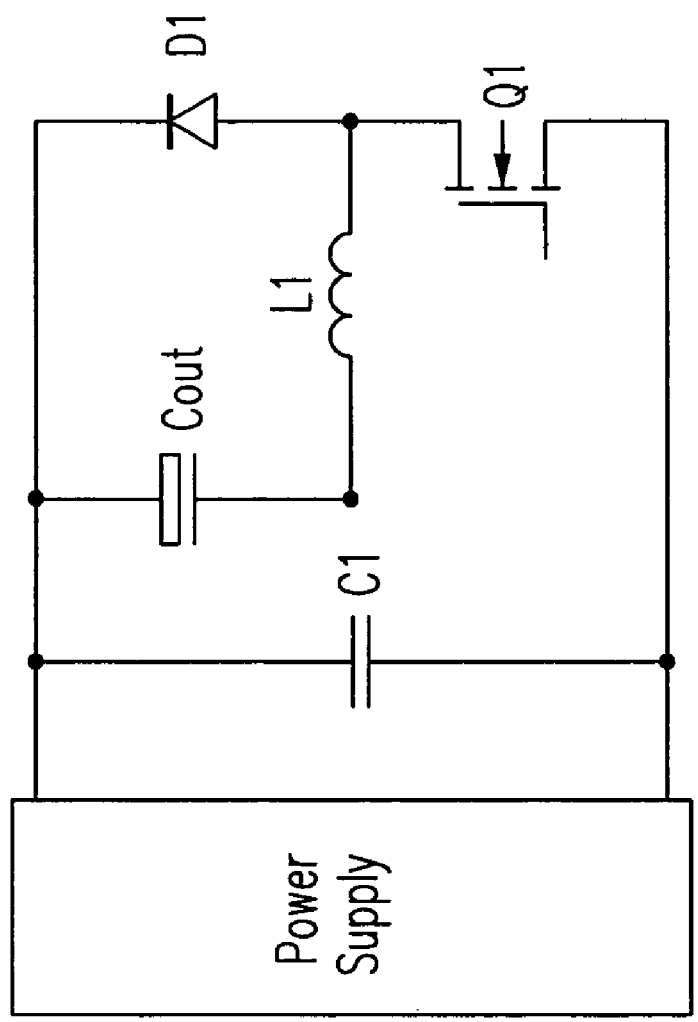
Figure 5:
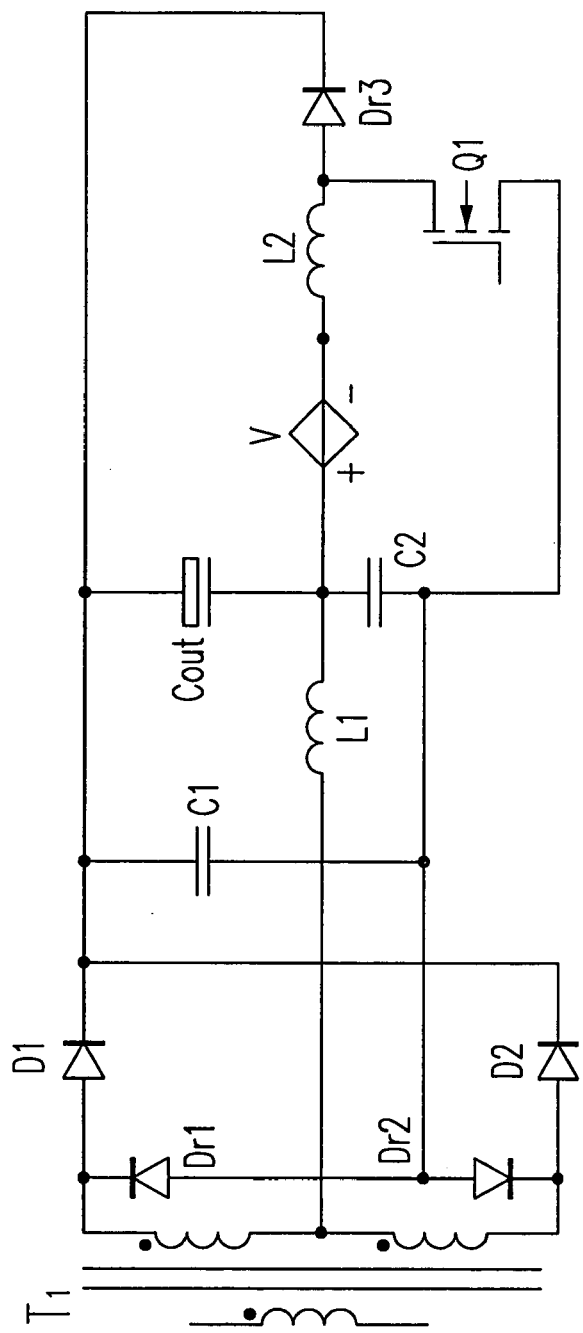
FIG. 5 is the schematic diagram of the first preferred embodiment of the present invention.

To overcome the drawbacks of the above-mentioned prior arts, certain improvements based on the aforementioned circuits of the prior arts as shown in FIGS. 2, 3, and 4 have been proposed in the present invention. These improvements are: among one of the three nodes of the loop formed by the output capacitor Cout, the diode D1, and the inductor L1 connected in series, a controllable voltage source is connected to one of the three nodes in series as shown in FIG. 5. Through the controllable voltage source, the inductor of the energy recycle circuit can be reset. The operational principles of the controllable voltage source will be described as follows using FIG. 5 as an example.

Figure 1:
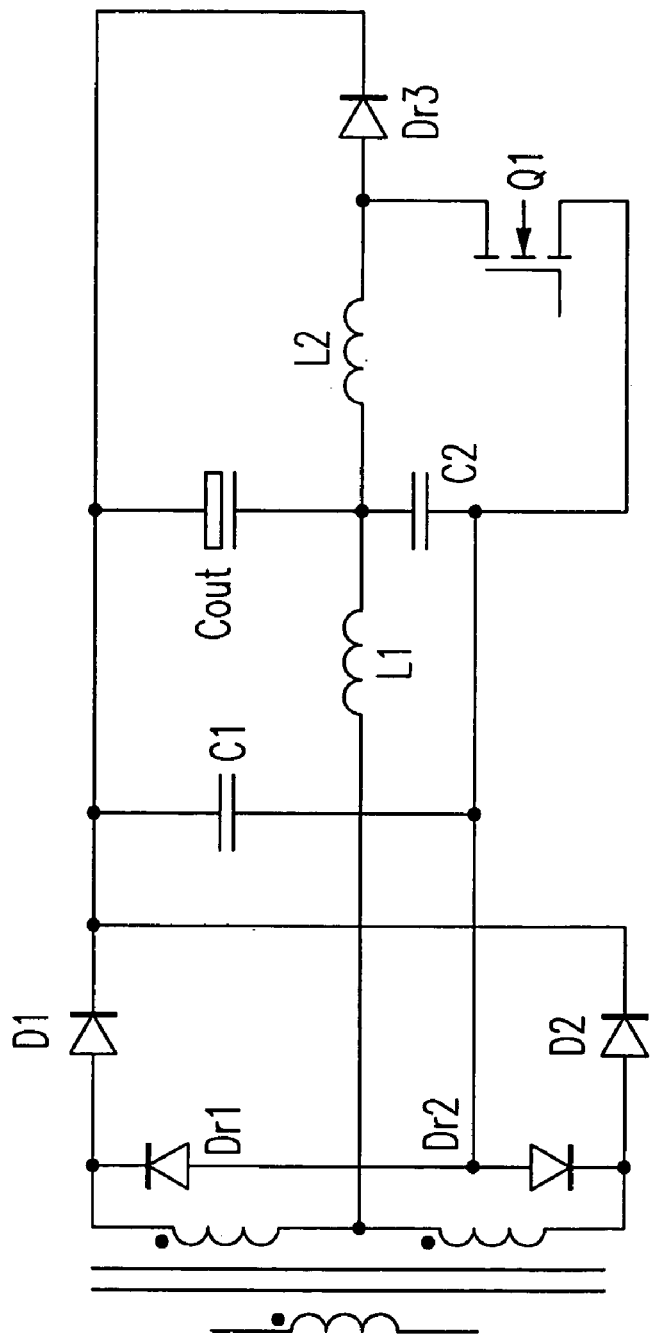
FIG. 1 is the schematic circuit diagram of a clamping and energy recycle circuit of the prior art.

Please refer to FIG. 5, notice that the difference between FIGS. 1 and 5 is that a controllable voltage source, V, is connected to the inductor L2 in series. When the voltage across the output capacitor Cout, Vcout, is less than a certain value, the value of the controllable voltage source is positive (see the reference direction as shown in FIG. 5), the sum of Vcout and V is employed to reset the inductor L2, and the energy of C2 is consumed by the controllable voltage source. When the voltage across the output capacitor Cout, Vcout, is normal, the voltage of the controllable voltage source is approximated to zero, almost all of the energy of C2 is transferred into the output capacitor Cout, and thus the effectiveness of the proposed apparatus is relatively higher.

One of the purposes of the present invention is to realize the aforementioned controllable voltage source through a simple auxiliary circuit. Thus, the apparatus for protecting a boost converter in the abnormal operation is proposed. Four preferred embodiments of the present invention are proposed as shown in FIGS. 6 to 10, and which are described as follows.

Figure 6:
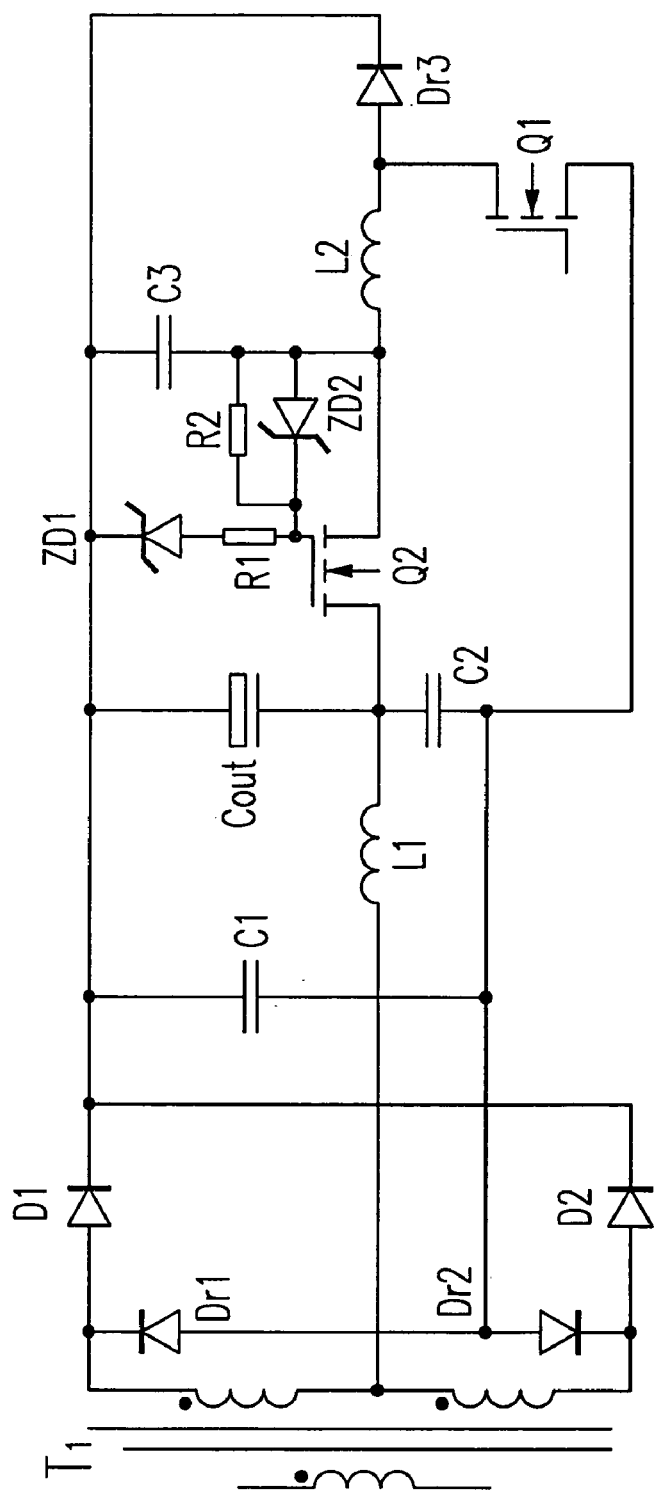
FIG. 6 is the schematic circuit diagram of the first preferred embodiment of the present invention.

Please refer to FIG. 6, which is the detailed circuit for the realization of the controllable voltage source described in FIG. 5. In which, T1 is a high frequency transformer, D1 and D2 are the first and second high frequency rectifying diodes, Dr1 and Dr2 are the first and second clamping diodes, Q1 is the energy recycle switch element, Q2 is the power switch element and could be operated under the saturated status and the linear status, Dr3 is the energy recycle diode, C1 and C2 are the second and first clamping capacitors, Cout is the output filter capacitor, L1 is the output filter inductor, L2 is the energy recycle inductor, ZD1 and ZD2 are the first and second regulating diodes, in which ZD1 is used to regulate the voltage of the controllable voltage source when the output filter capacitor Cout is in the abnormal operation, and ZD2 is used to protect the gate of the power switch element Q2, R1 and R2 are the current limiting and gate resistors, and C3 is a capacitor respectively.

In FIG. 6, the operational procedure can be divided into two status: the normal operation status and the abnormal operation status, which are described as follows. In the normal operation status, the clamping energy in the first clamping capacitor C2 is employed by the energy recycle circuit to charge the capacitor C3, and when the voltage across: C3 is larger than the regulating value of the first regulating diode ZD1, the power switch element Q2 is closed, and the power switch element Q2 could be operated under the saturated status. The energy of capacitor C3 is transferred into the output filter capacitor Cout. In the abnormal operation status, the voltage across the output filter capacitor Cout is zero, but the reverse recovery problems regarding the first and second rectifying diodes D1 and D2 still exist. To regulate the voltage across the regulating capacitor C1, the energy recycle circuit must be operated, the clamping energy across the first clamping capacitor C2 is employed by the energy recycle circuit to charge the capacitor C3, and the power switch element Q2 could be operated in the linear status through adjusting the design of the circuit to consume the energy absorbed by the clamping capacitor C2 on the power switch Q2 so as to protect the first and second rectifying diodes D1 and D2. Thus, the proposed circuit could be operated under the abnormal operation status.

To overcome the problem regarding that the inductor of the energy recycle circuit could not be reset in a typical boost converter as shown in FIGS. 2, 3, and 4, the idea of connecting a controllable voltage source width the inductor of the energy recycle circuit in series is employed, and four preferred embodiments are proposed as shown in FIGS. 7 to 10.

Please refer to FIGS. 7 to 10, in which C1 and Cout are the clamping and output capacitors, Q1 and Q2 are the boost and power switch elements, R1 and R2 are the current limiting and gate resistors, ZD1 and ZD2 are the first and second regulating diodes, C2 is a capacitor, L1 is the energy recycle inductor, and D1 is the energy recycle diode. In FIGS. 7 to 10, the energy recycle switch element Q1, the energy recycle inductor L1, and the energy recycle diode D1 are the components of the energy recycle circuit, and the power switch element Q2, the current limiting and gate resistors R1 and R2, the first and second regulating diodes ZD1 and ZD2, and capacitor C2 are the components of the controllable voltage source.

Figure 7:
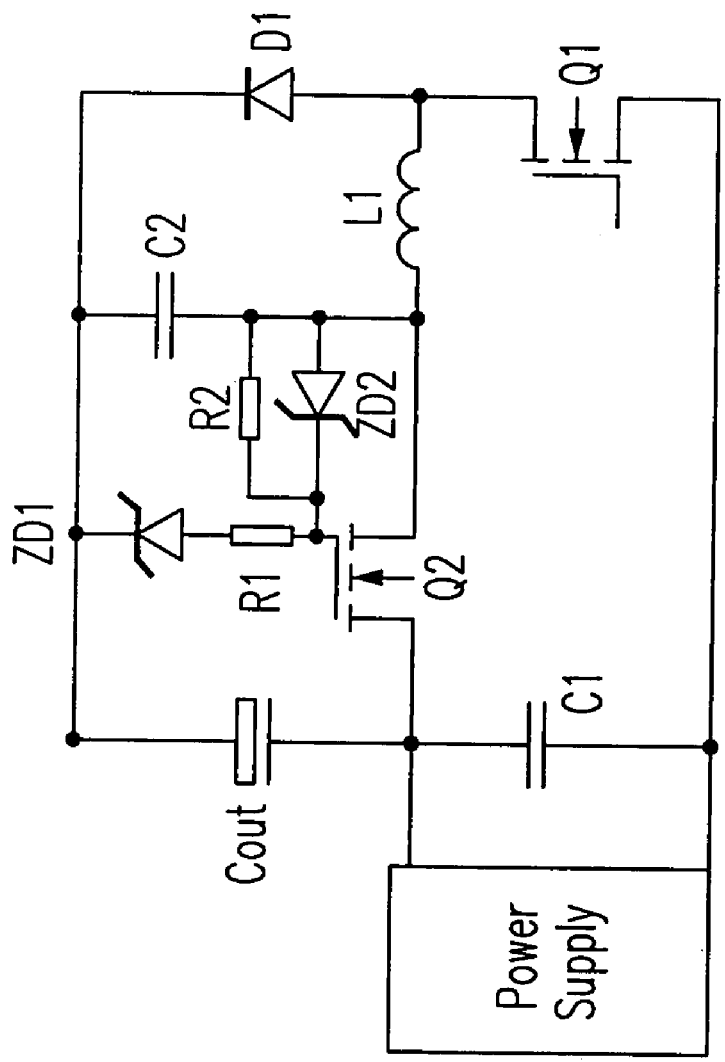
FIGS. 7, 8, 9, and 10 are the schematic circuit diagrams of the second to the fifth preferred embodiments of the present invention.
Figure 8:
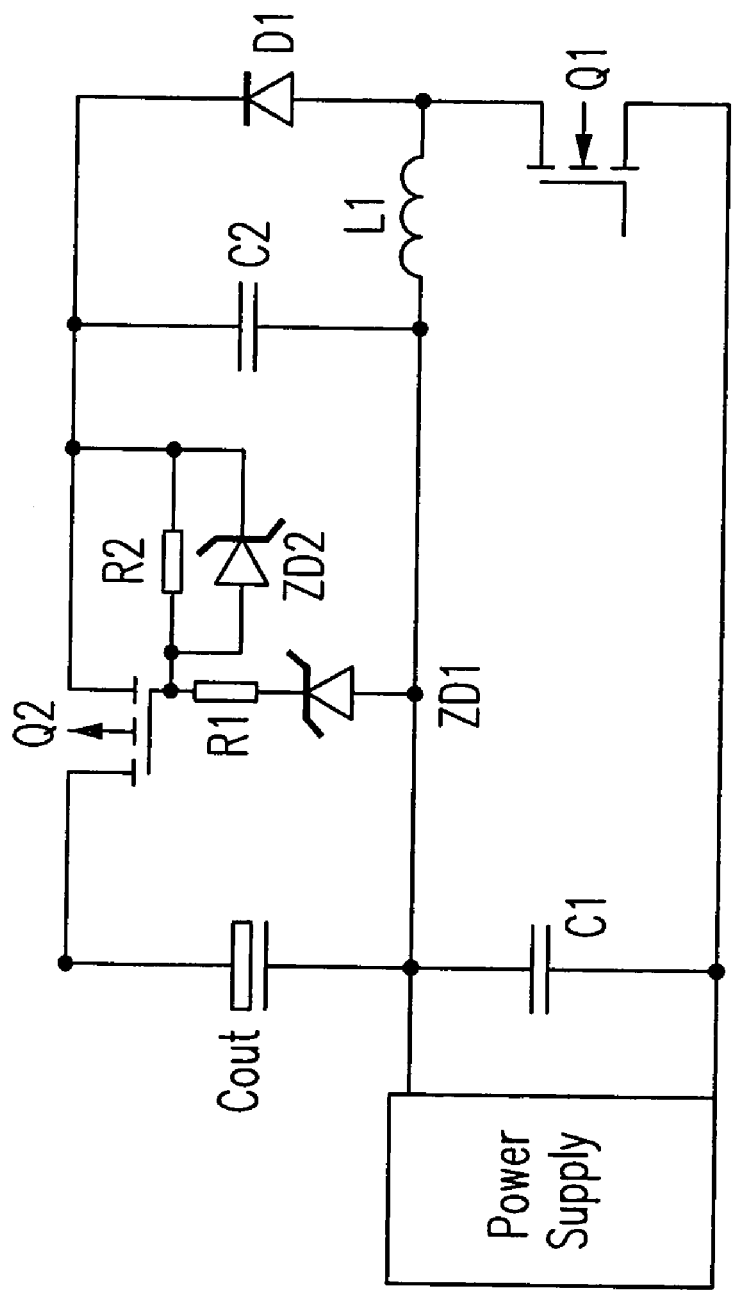

The first and second preferred embodiments of the proposed apparatus for protecting the boost converter in the abnormal operation, as shown in FIGS. 7 and 8, could be applied to the applications relate to the circuits of FIGS. 2 and 3. In FIG. 7, the power switch element Q2 is an N type MOS, and which could be an NPN type transistor as well. In FIG. 8, the power switch element Q2 is a P type MOS, and which could be a PNP type transistor as well.

Figure 9:
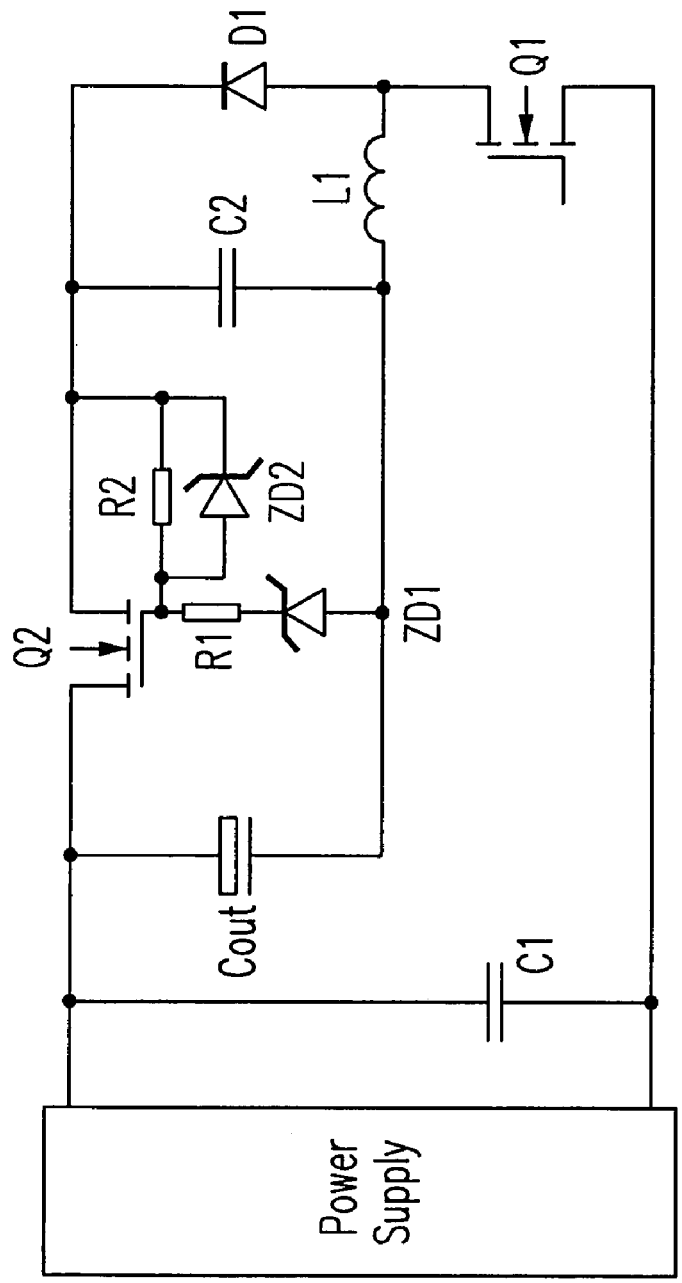
Figure 10:
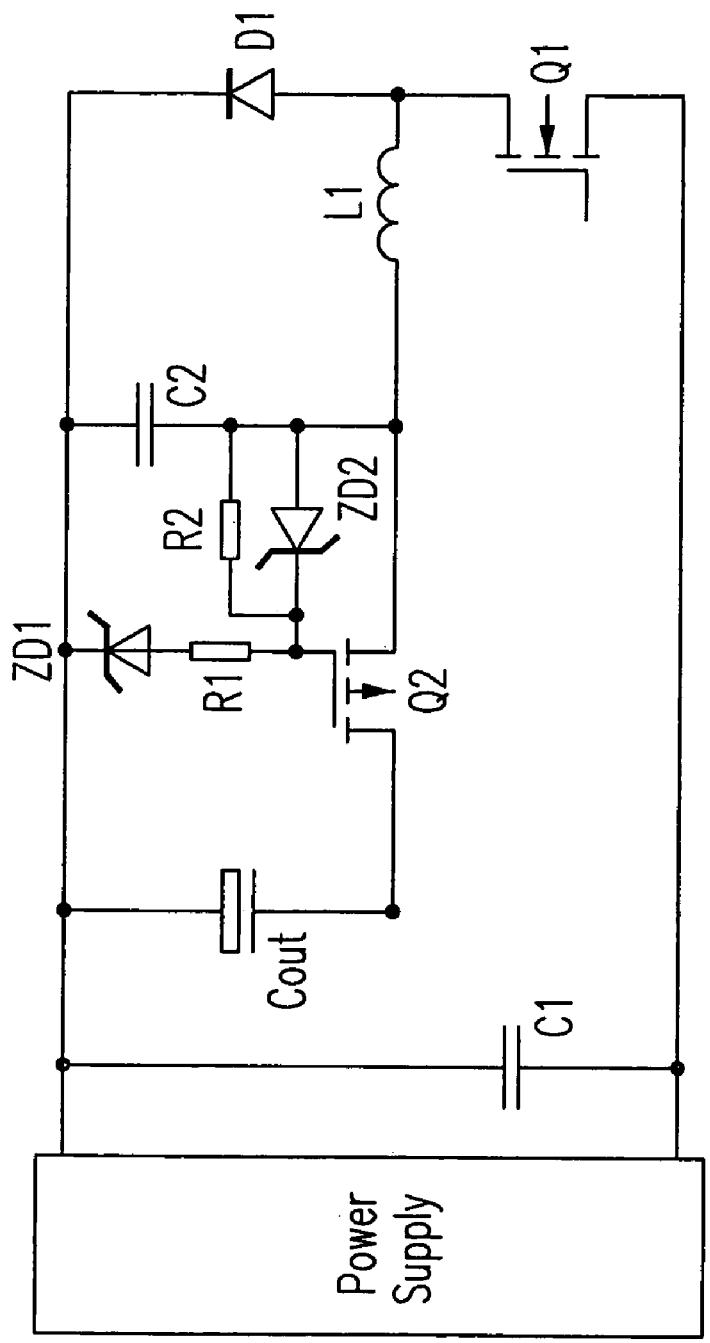

The third and fourth preferred embodiments of the proposed apparatus for protecting the boost converter in the abnormal operation, as shown in FIGS. 9 and 10, could be applied to the applications relate to the circuit of FIG. 6. In FIG. 9, the power switch element Q2 is an N type MOS, and which could be an NPN type transistor as well. In FIG. 10, the power switch element Q2 is a P type MOS, and which could be a PNP type transistor as well.

The proposed circuits, as shown in FIGS. 7 to 10, are the examples of a kind of circuits for protecting the boost converter in the abnormal operation, and which should not be limited to the applications of the power clamping and energy recycle circuit only.

In conclusion, the apparatus for protecting the boost converter in the abnormal operation is provided in the present invention such that the inductor of the energy recycle circuit could be reset by the controllable voltage source. The proposed apparatus could be applied to the clamping and energy recycle circuit so as to consume the clamping energy of the clamping capacitor on the controllable voltage source. When the output is normal, the voltage across the output capacitor Cout is the normal voltage, and the voltage of the controllable voltage source is very close to zero such that almost all of the clamping energy of C2 is transferred into the output capacitor Cout so as to increase the effectiveness of the system.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. An apparatus for protecting a boost converter in an abnormal operation, wherein said boost converter comprises a transformer, a full-wave rectifier circuit electrically connected to a secondary winding of said transformer, an output filter inductor, an output filter capacitor, a clamping circuit having two clamping diodes with two anodes electrically connected to each other to form a common-anode terminal, a first clamping capacitor with a first terminal electrically connected to a node joining said filter inductor and said filter capacitor, and a second terminal electrically connected to said common-anode terminal, and an energy recycle circuit, comprising:
a controllable voltage source having a first terminal electrically connected to said node and a second terminal electrically connected to said energy recycle circuit.

2. The apparatus according to claim 1, wherein said full-wave rectifier circuit comprises two rectifying diodes with two anodes electrically connected to said secondary winding respectively and two cathodes electrically connected to each other to form a common-cathode terminal.

3. The apparatus according to claim 2, wherein said clamping circuit further comprises a second clamping capacitor with a first terminal electrically connected to said common-cathode terminal and a second terminal electrically connected to said common-anode terminal.

4. The apparatus according to claim 2, wherein said energy recycle circuit comprises:
an inductor having a first terminal electrically connected to said controllable voltage source;
a first switch element having a first terminal electrically connected to a second terminal of said inductor and a second terminal electrically connected to said common-anode terminal; and
a diode with an anode electrically connected to said second terminal of said inductor and a cathode electrically connected to said common-cathode terminal.

5. The apparatus according to claim 2, wherein said controllable voltage source comprises:
a second switch element having a first terminal electrically connected to said node, a second terminal electrically connected to said energy recycle circuit, and a control terminal;
a first regulating diode with a cathode electrically connected to said common-cathode terminal;
a first resistor with a first terminal electrically connected to an anode of said first regulating diode and a second terminal electrically connected to said control terminal of said second switch element;
a capacitor with a first terminal electrically connected to said common-cathode terminal and a second terminal electrically connected to said second terminal of said second switch element;
a second resistor with a first terminal electrically connected to said second terminal of said capacitor and a second terminal electrically connected to said control terminal of said second switch element; and
a second regulating diode with a cathode electrically connected to said control terminal of said second switch element and an anode electrically connected to said second terminal of said capacitor.

6. An apparatus for protecting a boost converter having a clamping capacitor, an output capacitor, and an energy recycle circuit with an inductor, a first switch element, and a diode in an abnormal operation, wherein said apparatus is electrically connected to a power supply, said clamping capacitor is electrically connected to said power supply in parallel, a first terminal of said output capacitor is electrically connected to said clamping capacitor at a first node in series, and said output capacitor, said diode, and said inductor form a loop in series, comprising:
a controllable voltage source electrically connected to one of three nodes of said loop in series and having a first terminal electrically connected to said inductor of said energy recycle circuit and a second terminal electrically connected to said first node, comprising:
a second switch element having a first terminal electrically connected to said first node, a second terminal electrically connected to said inductor of said energy recycle circuit, and a control terminal;
a first regulating diode with a cathode electrically connected to a second terminal of said output capacitor;
a first resistor with a first terminal electrically connected to an anode of said first regulating diode and a second terminal electrically connected to said control terminal of said second switch element;
a capacitor with a first terminal electrically connected to said second terminal of said output capacitor and a second terminal electrically connected to said second terminal of said second switch element;
a second resistor with a first terminal electrically connected to said second terminal of said capacitor and a second terminal electrically connected to said control terminal of said second switch element; and
a second regulating diode with a cathode electrically connected to said control terminal of said second switch element and an anode electrically connected to said second terminal of said capacitor.

7. An apparatus for protecting a boost converter having a clamping capacitor, an output capacitor, and an energy recycle circuit with an inductor, a first switch element, and a diode in an abnormal operation, wherein said apparatus is electrically connected to a power supply, said clamping capacitor is electrically connected to said power supply in parallel, a first terminal of said output capacitor is electrically connected to said clamping capacitor at a first node in series, and said output capacitor, said diode, and said inductor form a loop in series, comprising:
a controllable voltage source electrically connected to one of three nodes of said loop in series and having a first terminal electrically connected to said inductor of said energy recycle circuit and a second terminal electrically connected to a second terminal of said output capacitor, comprising:
a first regulating diode with an anode electrically connected to said first node;
a first resistor with a first terminal electrically connected to a cathode of said first regulating diode;
a second switch element having a first terminal electrically connected to said second terminal of said output capacitor, a second terminal, and a control terminal electrically connected to a second terminal of said first resistor;
a capacitor with a first terminal electrically connected to said second terminal of said second switch element and a second terminal electrically connected to said first node;
a second resistor with a first terminal electrically connected to said second terminal of said first resistor and a second terminal electrically connected to said second terminal of said second switch element; and
a second regulating diode with a cathode electrically connected to said second terminal of said second resistor and an anode electrically connected to said first terminal of said second resistor.

* * * * *